US008834241B2

(12) United States Patent
Uhlenbusch

(10) Patent No.: US 8,834,241 B2
(45) Date of Patent: Sep. 16, 2014

(54) AIR NOZZLE

(75) Inventor: Olaf Uhlenbusch, Marktzeuln (DE)

(73) Assignee: Dr. Schneider Kunststoffwerke GmbH, Kronach (DE)

( * ) Notice: Subject to any disclaimer, the term of this patent is extended or adjusted under 35 U.S.C. 154(b) by 156 days.

(21) Appl. No.: 12/736,642

(22) PCT Filed: Apr. 20, 2009

(86) PCT No.: PCT/EP2009/054661

§ 371 (c)(1),
(2), (4) Date: Oct. 26, 2010

(87) PCT Pub. No.: WO2009/141202

PCT Pub. Date: Nov. 26, 2009

(65) Prior Publication Data

US 2011/0039488 A1    Feb. 17, 2011

(30) Foreign Application Priority Data

May 19, 2008  (DE) ...................... 20 2008 000 059 U

(51) Int. Cl.
*B60H 1/34*     (2006.01)
*F24F 13/075*   (2006.01)

(52) U.S. Cl.
CPC ............ *F24F 13/075* (2013.01); *B60H 1/3421* (2013.01); *B60H 2001/3464* (2013.01)
USPC .......................................... 454/155; 454/154

(58) Field of Classification Search
USPC .......................................... 454/155, 152, 154
See application file for complete search history.

(56) References Cited

U.S. PATENT DOCUMENTS 4,702,155 A * 10/1987 Hildebrand et al. .......... 454/155
4,928,582 A *  5/1990 Elfverson ...................... 454/155

(Continued)

FOREIGN PATENT DOCUMENTS

DE    2 040 641       3/1971
DE    202 13 250     11/2002

(Continued)

OTHER PUBLICATIONS

International Search Report, Jun. 19, 2009.*

(Continued)

*Primary Examiner* — Steven B McAllister
*Assistant Examiner* — Jonathan Cotov
(74) *Attorney, Agent, or Firm* — Collard & Roe, P.C.

(57) ABSTRACT

The invention relates to an air nozzle for conducting air flow from an air feed shaft or a duct from a heating, ventilating or air-conditioning installation, particularly in a motor vehicle, with a housing having a connection at the back for the air feed shaft and an air outlet opening at the front. Air guide elements with blades adjustable by way of a coupling rod are present in the air outlet opening. The axles (4) of the individual blades (5) are arranged in a blade ring (2) with one lateral coupling rod (3) or two lateral coupling rods (3), wherein the middle blade (5) is constructed as a control blade and has an actuating element (6) for adjusting the blades (5). The blade ring (2) is inserted, together with the blades (5), in an annular guide (7) of the mount (1) and is coupled with an adjusting ring (8), which is rotatably mounted in the annular guide (7) and which has at its outer circumference control elements (9) for rotating the blade ring (2). A cover mask (10) with a central passage, through which the actuating element (6) for the blades (5) is accessible or from which the actuating element protrudes to be operable, is present in the opening of the adjusting ring (8).

10 Claims, 3 Drawing Sheets

(56) References Cited

U.S. PATENT DOCUMENTS

Figure 9:
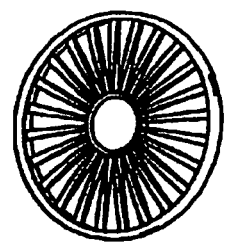

| | | | |
|---|---|---|---|
| 5,340,357 A * | 8/1994 | Nagai et al. | 454/155 |
| 5,520,579 A * | 5/1996 | Saida | 454/155 |
| 6,059,652 A * | 5/2000 | Terry et al. | 454/155 |
| 6,159,092 A * | 12/2000 | Elder | 454/155 |
| 6,176,775 B1 * | 1/2001 | Volk | 454/154 |
| 6,342,003 B1 * | 1/2002 | Wang | 454/155 |
| 6,932,695 B1 * | 8/2005 | Zielinski et al. | 454/155 |
| 7,566,261 B2 * | 7/2009 | Ono et al. | 454/155 |
| 2002/0031999 A1 * | 3/2002 | Baba et al. | 454/155 |
| 2005/0239390 A1 * | 10/2005 | Leopold | 454/154 |
| 2005/0245189 A1 * | 11/2005 | Terai et al. | 454/155 |
| 2006/0172681 A1 * | 8/2006 | Steinbeiss | 454/152 |
| 2007/0066206 A1 * | 3/2007 | Ono et al. | 454/69 |
| 2007/0232216 A1 * | 10/2007 | Shibata | 454/155 |
| 2008/0171509 A1 * | 7/2008 | Grossmann et al. | 454/155 |
| 2010/0029191 A1 * | 2/2010 | Arndt et al. | 454/154 |
| 2010/0068982 A1 * | 3/2010 | Guerreiro et al. | 454/152 |
| 2011/0045758 A1 * | 2/2011 | Bastian | 454/152 |
| 2011/0195650 A1 * | 8/2011 | Uhlenbusch | 454/152 |
| 2011/0250830 A1 * | 10/2011 | Steinbeiss et al. | 454/154 |
| 2012/0122387 A1 * | 5/2012 | Nicola et al. | 454/155 |

FOREIGN PATENT DOCUMENTS

| | | | |
|---|---|---|---|
| DE | 103 21 518 | 3/2004 | |
| DE | 10 2004 013 171 | 6/2005 | |
| DE | 102004013171 B3 * | 6/2005 | |
| EP | 1 319 449 | 6/2003 | |
| EP | 1 826 043 | 8/2007 | |
| EP | 1 872 988 | 1/2008 | |
| GB | 1 319 449 | 6/1973 | |
| GB | 1319449 * | 6/1973 | F24F 13/06 |

OTHER PUBLICATIONS

International Search Report.

* cited by examiner

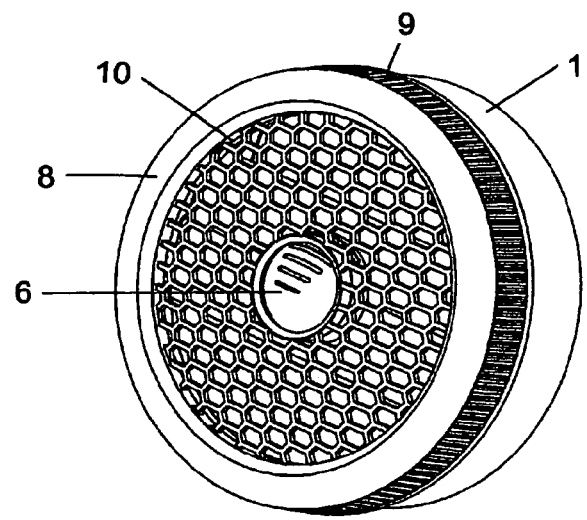
Fig. 1
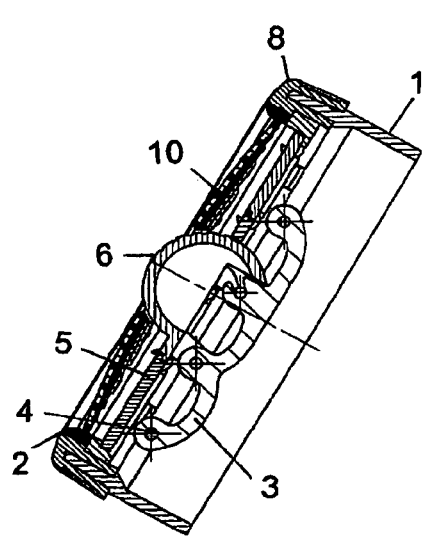 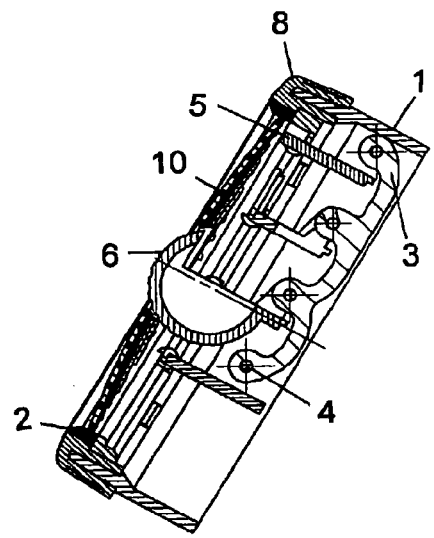
Fig. 2        Fig. 3

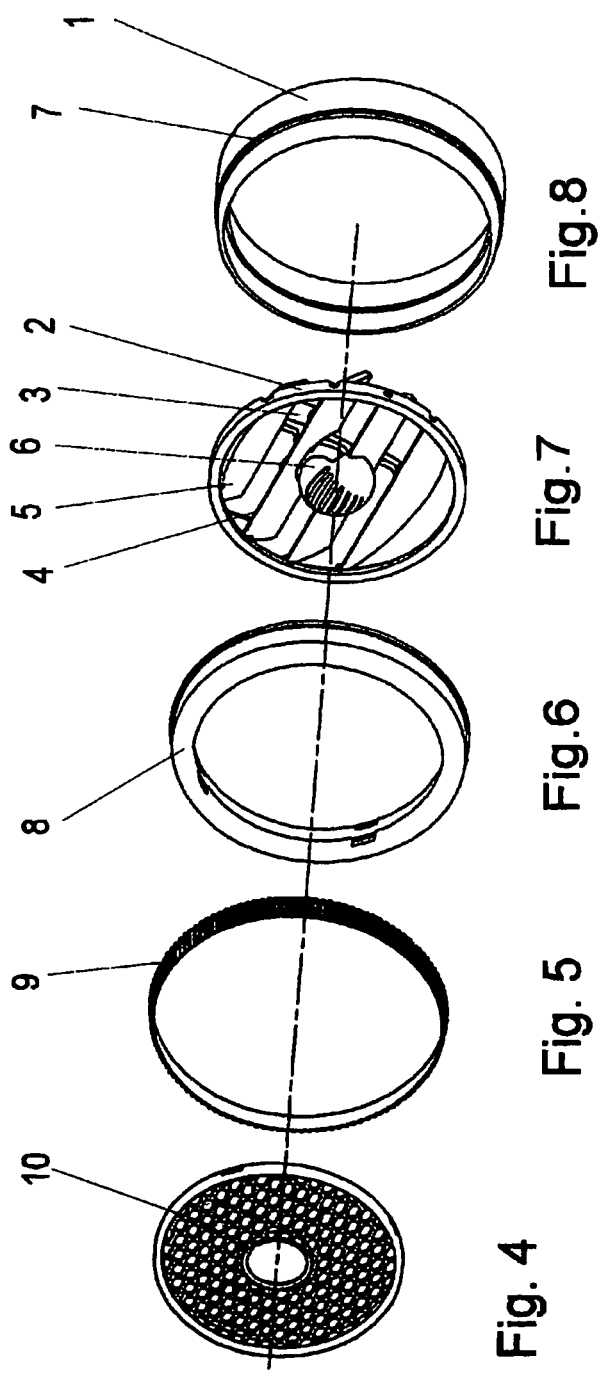

AIR NOZZLE

CROSS REFERENCE TO RELATED APPLICATIONS

This application is the National Stage of PCT/EP2009/054661 filed on Apr. 20, 2009, which claims priority under 35 U.S.C. §119 of German Application No. 20 2008 000 059.9 filed on May 19, 2008, the disclosure of which is incorporated by reference. The international application under PCT article 21(2) was not published in English.

The invention relates to an air nozzle for guidance of an air flow from an air feed shaft, such as a duct from a heating, ventilating or air-conditioning installation, particularly in motor vehicles, with the features stated in the preamble.

Air nozzles for guidance of an air flow are known from many technical applications, which are installed as standard in motor vehicles. In that case it is important that the air flow issuing from the air nozzles can be so directed that it is perceived by the occupants to be pleasant. The outlet elements of the air nozzles thus have to be designed so that the direction of the issuing air flow is settable in its direction and strength as desired.

Blades, which are pivotable in a mount, have proved themselves in the art as air guide elements. The blades in open state of the air outlet channel lie parallelly one above the other and in the closed state they overlap or adjoin one another. A throttle flap can also be arranged in the nozzle housing.

A round nozzle of the kind according to category is known from US 2007/066206 A1, in which two blade-shaped air guide elements as adjustable outlet closure elements are pivotably mounted in a rotatable housing cage with a setting ring. Through pressing on the upper air guide element in the upper edge region this is pivoted about the pivot axis and brought from a closed setting to an open setting. The second air guide element is pivoted in the same manner therewith by way of the coupling rod. The air guide elements in that case protrude beyond the setting ring at the front side. The direction of issue can be changed by rotation of the setting ring at the housing. An unpleasant appearance due to the air guide elements protruding at the front beyond the setting ring arises in all opening settings. Moreover, distribution of the air flow is virtually impossible.

A pivot nozzle, such as is used in ventilating or heating systems in motor vehicles, ship cabins and aircraft cabins or in other spaces, with fixed blades is known from EP 1 319 449 as well as DE 20 40 641 A1 of equivalent content. The nozzle is mounted so that it can be pivoted and/or tilted in order to be able to divert the transiting air flow in a desired direction. A flap valve for opening and closing the nozzle and for setting the air flow flowing therethrough is provided in the nozzle. The flap valves in the nozzle are in that case mounted to be pivotable about a joint extending transversely through the nozzle and have one or more projections for sliding engagement in a slot or slots, which is or are inclined relative to the axis of the nozzle, in the nozzle wall. The valve flaps are so connected with a control element, which is accessible from the front side of the nozzle and rotatable by hand about a central longitudinal axis, that rotation of the control element moves the flaps relative to the slot or slots which guide the projections for actuation of the flaps. For arrangement in a round nozzle it is in that case provided that the blades are fixedly arranged in a rotatable ring and a round bearing, into which the actuating element for the flaps can be inserted from behind, is provided centrally.

An air nozzle in the form of a round nozzle, in the case of which the housing for the air flow is divided, is disclosed in DE 103 21 518 A1, wherein the rear part of the housing is connected with the air feed and the front part contains the blades. The two housing parts are rotatable relative to one another so that the position of the blades and thus the direction of the air flow can be changed.

A further solution of this kind is disclosed in DE 10 2004 013 171 B3. The blades are interconnected by way of a coupling rod, by which the passage opening for the air can be regulated and the blades can be turned together so that the direction of the issuing air flow can be changed.

A special design of the blades is disclosed in EP 1 826 043 A1. Provided in the housing for the air guide is at least one component with a base body, which is provided with a wavy surface structure transversely to the flow direction of the air flow or at a defined angle relative thereto. This shape leads to a higher degree of stability of the blades, an optimal flow behaviour and an improved closing function.

In all these solutions the air always flows at a defined strength in a preselected direction. The blades in that case are visible, which does not correspond with a pleasing design, since they are visible with different openings widths and directions.

It is accordingly the object of the present invention to propose a distributor system for an air flow from an air feed shaft or a duct from a heating, ventilating or air-conditioning installation, particularly of a motor vehicle, which allows uniform distribution of the air and improves the design of the ventilating nozzle.

The object is fulfilled by the features of the characterising part of patent claim 1.

The air nozzle for conducting an air flow from an air feed shaft or a guide from a heating, ventilating or air-conditioning installation, particularly of a motor vehicle, is so designed that the axles of the individual blades are rotatably mounted in a blade ring and are coupled in terms of movement with one another by one or two lateral coupling rods, wherein the middle blade is constructed as a control blade and has an actuating element for adjusting the blades. The blade ring is arranged, together with the blades, in an annular mount, which is furnished with an annular guide and which is inserted in the air outlet opening of the housing, and is coupled with an adjusting ring, which is rotatably mounted in the annular guide and which has at its outer circumference control elements for rotating the blade ring.

A cover mask with a central passage, through which the actuating element for the blades is accessible or from which the actuating element protrudes to be operable, is present in the opening of the adjusting ring. If the actuating element is of internally hollow construction, the coupling rod can be clipped at the inside on the pivot axle, for example by a detent rotary bearing. The coupling rod can also be mounted laterally at the actuating element on the pivot axle. Provided for coupling of the further blades together are bearing shells which can be clipped to the coupling rod and which are detented on the exposed axle sections. These can also be offset laterally. The coupling rod has to be constructed correspondingly.

The actuating element for the blades can preferably be of ball-shaped or roller-shaped construction and protrude from the central passage of the cover mask, so that it can be easily actuated by a finger. In order to recognise the rotary position of the blades, markings can be present on the ball-shaped actuating element, for example dashes, which lie parallel to the blades.

If a roller-shaped actuating element is used, the setting of the roller also indicates the position of the blades.

The control elements at the adjusting ring can represent nubs or consist of a knurled ring at the circumference of the adjusting ring or of one or more pins or hooks.

The cover mask can preferably represent an air distributor plate in order to distribute the direct air flow. It is also possible to quickly exchange the cover plates if necessary. In addition, it is possible to make use of filter or scent platelets.

A design ring or atomiser ring can also be placed on the cover mask or instead thereof, which ring also holds the cover mask and frees it for exchange.

An important advantage of the invention results from the fact that the blade adjustment is covered by the cover mask and is no longer visible from the outside. A further advantage of the present invention is that the air flow is distributed by the cover mask and/or the atomiser ring, i.e. the direct action of the air flow is swirled by the cover mask, whereby a diffuse air flow arises.

Filter inserts or inserts with scent substances directly at the cover mask or the atomiser ring can produce an enhancement of the air supply.

The invention shall be explained in the following by way of an exemplifying embodiment. The same reference numerals in the individual drawings signify the same or similar parts.

Figure 10:
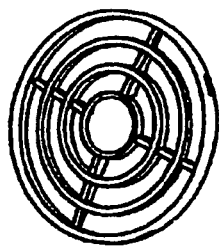
Figure 11:
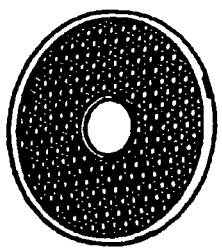

FIG. 1 shows an air nozzle in correspondence with the present invention,

FIG. 2 shows a cross-section through the air nozzle in correspondence with the present invention, with closed blades, FIG. 3 shows a cross-section through the air nozzle in correspondence with the present invention, with open blades, FIGS. 4 to 8 show the individual parts of the air nozzle according to FIG. 1, in the way in which they are inserted in one another, and FIGS. 9 to 11 show different cover masks.

An air nozzle for conducting an air flow from an air feed shaft or a duct from a heating, ventilating or air-conditioning installation, particularly a motor vehicle, in correspondence with the present invention is illustrated in FIG. 1. The air nozzle is disposed in the air outlet opening in a housing, which is inserted in a wall passage and which has a rear connection for the air feed shaft and a front air outlet opening. Air guide elements with blades 5 adjustable by way of a coupling rod 3 are present in the air outlet opening. The axles 4 of the individual blades 5 are arranged in a blade ring 2 with a central coupling rod 3. Two lateral coupling rods 3 can also be present. The centre blade 5 is constructed as a control blade and has an actuating element 6 for adjusting the blades 5. The blade ring 2 together with the blades 5 is inserted in an annular mount 1, which is equipped with an annular guide 7, in the air outlet opening and is coupled with an adjusting ring 8, which is rotatably mounted in the annular guide 7 and which has at its outer circumference control elements 9 for rotating the blade ring 2. A cover mask 10 with a central passage, through which the actuating element 6 for the blades 5 is accessible, is present in the opening of the adjusting ring 8. The actuating element 6 for the blades 5 is of spherical construction in the exemplifying embodiment and carries a marking indicating the rotational setting of the blades 5 relative to the encircling ring in a cover element, in which ring the actuating element engages.

FIG. 2 and FIG. 3 each show a cross-section through the air nozzle, wherein the blades 5 are closed in FIG. 2 and open in FIG. 3. The spherical actuating element 6 for the blades 5, which can be rotated inwardly simply by one finger, presses against the control blade and opens or closes the blades 5.

The individual parts of the air nozzle in the manner in which they are inserted into one another at the time of assembly are illustrated in FIG. 4 to FIG. 8. The mount 1 is illustrated in FIG. 8. The blade ring 2 together with the blades 5 and the actuating element 6 for the blades 5 is inserted in this. The adjusting ring 8 according to FIG. 6 follows thereafter. The control element 9 according to FIG. 5, which in this exemplifying embodiment represents a knurled ring, is placed on the adjusting ring 8. The cover mask 10 is inserted in the opening of the adjusting ring 8. In the mounted state, the actuating element 6 for the blades 5 protrudes from the central passage of the cover mask 10. In this illustration the actuating element is a spherical actuating element 6 with markings in the form of dashes.

FIG. 9 to FIG. 11 show some forms of embodiment of the cover mask 10 by way of which the different air swirl effects are achievable. FIG. 9 shows a radiating cover mask 10, FIG. 10 shows an annular cover mask 10 and FIG. 11 shows an apertured mask 10.

The apertured mask 10 in correspondence with FIG. 11 exhibits a particularly good air swirling effect. Other cover masks leading to pleasant ventilation are conceivable.

The blades are inserted within an inner diameter of the annular mount and the blade ring is mounted in the annular guide such that it contacts the annular guide. The function of the cover mask is to allow air to flow so as to not substantially redirect air off a central axis of the housing.

The invention claimed is:

1. Air nozzle for conducting an air flow from an air feed shaft or a duct from a heating, ventilating or air-conditioning installation, particularly in a motor vehicle,
   with a housing, which is inserted in or behind a wall passage and which has a connection at the rear side for the air feed shaft and an air outlet opening at the front side,
   wherein present in the air outlet opening are air guide elements with blades, which are adjustable by way of at least one laterally arranged coupling rod on manual pivotation of a blade and the axles of which are arranged in a blade ring, which together with the blades is inserted in an annular mount, the blades are inserted within an inner diameter of the annular mount, which is equipped with an annular guide, into the air outlet opening,
   wherein the middle blade is constructed as a control blade and has a protruding actuating element for adjusting the blades, and the protruding actuating element is pivotable around an axis parallel to the axles, wherein the protruding actuating element for the blades is ball shaped and has markings for recognition of the rotational position of the blades,
   wherein the blade ring is coupled with an adjusting ring, which is rotatably mounted in the annular guide and that the blade ring is mounted in the annular guide such that it contacts the annular guide and which has at its outer circumference control elements for turning the blade ring, and
   wherein a cover mask with a central passage, through which the actuating element for the blades is accessible or from which the actuating element protrudes to be operable, is present in the opening of the adjusting ring, and
   wherein the cover mask allows air to flow as to not substantially redirect air off a central axis of the housing.

2. Air nozzle according to claim 1, wherein the markings represent dashes extending parallel to the blades.

3. Air nozzle according to claim 1, wherein the control elements at the adjusting ring consist of nubs or a knurled ring at the circumference of the adjusting ring or a pin or hook.

4. Air nozzle according to claim 1, wherein the cover mask represents an air distributor plate.

5. Air nozzle according to claim 1, wherein the cover mask represents a filter.

6. Air nozzle according to claim 5, wherein a design ring or atomizer ring is placed on the cover mask.

7. Air nozzle according to claim 4, wherein the cover mask or a design ring or an atomizer ring is exchangeable.

8. Air nozzle according to claim 1,
wherein the actuating element is of internally hollow construction, and wherein the coupling rod is clipped at inside of the actuating element on the pivot axle.

9. Air nozzle according to claim 8, wherein the coupling rod is clipped by a detent rotary bearing.

10. Air nozzle according to claim 1, wherein the coupling rod is also mounted laterally at the actuating element on the pivot axle.

* * * * *